US012662977B2

(12) United States Patent
Miossec et al.

(10) Patent No.: US 12,662,977 B2
(45) Date of Patent: Jun. 23, 2026

(54) EJECTION CONE WITH AN ACOUSTIC CHAMBER FOR AN AIRCRAFT TURBINE ENGINE

(71) Applicant: SAFRAN NACELLES, Gonfreville-l'Orcher (FR)

(72) Inventors: Tony Miossec, Moissy-Cramayel (FR); Fabien Bravin, Moissy-Cramayel (FR); Christophe Jean François Thorel, Moissy-Cramayel (FR); Marc Versaevel, Moissy-Cramayel (FR); Valentin Simeon, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 17 days.

(21) Appl. No.: 18/843,154

(22) PCT Filed: Mar. 2, 2023

(86) PCT No.: PCT/FR2023/050282
§ 371 (c)(1),
(2) Date: Aug. 30, 2024

(87) PCT Pub. No.: WO2023/166266
PCT Pub. Date: Sep. 7, 2023

(65) Prior Publication Data
US 2025/0188887 A1      Jun. 12, 2025

(30) Foreign Application Priority Data
Mar. 2, 2022     (FR) ...................................... 2201806

(51) Int. Cl.
*F02K 1/04*          (2006.01)
*F02C 7/28*          (2006.01)

(52) U.S. Cl.
CPC . *F02K 1/04* (2013.01); *F02C 7/28* (2013.01)

(58) Field of Classification Search
CPC ....................................................... F02C 7/28
See application file for complete search history.

(56) References Cited

U.S. PATENT DOCUMENTS

2007/0220894 A1     9/2007   Bouty et al.
2015/0034412 A1     2/2015   Mecuson et al.
(Continued)

FOREIGN PATENT DOCUMENTS

EP          3683429 A1      7/2020
EP          3839238 A1      6/2021

OTHER PUBLICATIONS

International Search Report mailed Jun. 9, 2023, issued in corresponding International Application No. PCT/FR2023/050282, filed Mar. 2, 2023, 6 pages.
(Continued)

*Primary Examiner* — Phutthiwat Wongwian
*Assistant Examiner* — Jacek Lisowski
(74) *Attorney, Agent, or Firm* — Christensen O'Connor Johnson Kindness PLLC

(57)           ABSTRACT

An exhaust cone for an aircraft turbomachine, extending along a longitudinal axis and having a radially internal annular wall and a radially external skin delimiting a primary flow path for hot gases and surrounding the internal annular wall, and partitions mounted radially between the external skin and the internal annular wall and intersecting them in a manner that together with the skin and wall delimits acoustic chambers. The exhaust cone can further include at least one seal arranged between a radial end of one of the partitions and at least one among the internal annular wall and the external skin.

12 Claims, 8 Drawing Sheets

(56)        References Cited

U.S. PATENT DOCUMENTS

| | | | |
|---|---|---|---|
| 2015/0258324 A1* | 9/2015 | Chida | A61M 39/10 |
| | | | 604/538 |
| 2015/0322890 A1* | 11/2015 | Lu | B23P 15/008 |
| | | | 29/889.22 |
| 2015/0354386 A1* | 12/2015 | Chuong | F02C 7/28 |
| | | | 415/182.1 |
| 2016/0076391 A1* | 3/2016 | Guinn | F02C 7/28 |
| | | | 277/591 |
| 2021/0140334 A1* | 5/2021 | Sudre | C04B 35/80 |
| 2021/0215122 A1* | 7/2021 | Brochard | G10K 11/161 |

OTHER PUBLICATIONS

Written Opinion mailed mailed Jun. 9, 2023, issued in corresponding International Application No. PCT/FR2023/050282, filed Mar. 2, 2023, 7 pages.

* cited by examiner

EJECTION CONE WITH AN ACOUSTIC CHAMBER FOR AN AIRCRAFT TURBINE ENGINE

CROSS-REFERENCES TO RELATED APPLICATIONS

This application is a National Stage of International Application No. PCT/FR2023/050282, filed Mar. 2, 2023, which claims priority to French Patent Application No. 2201806, filed Mar. 2, 2022, the entire disclosures of which are hereby incorporated by reference in their entirety for all purposes.

TECHNICAL FIELD

Embodiments of the disclosure relate to a cone of an aircraft turbomachine, in particular an exhaust cone (also referred to as an ejection cone) with a sealed acoustic chamber.

BACKGROUND

This disclosure relates to an assembly located at the rear of an aircraft turbojet engine, at a downstream end, for optimizing the flow of air expelled by the turbojet engine. More specifically, this disclosure relates to the connection between what is often called the exhaust cone and a casing of the turbojet engine, located just upstream of the exhaust cone, for example a casing for the gas exiting the turbojet engine.

FIG. 1 shows an assembly for an aircraft turbojet engine, comprising a central gas ejection element which is annular about a longitudinal axis X and is adapted so that gas is ejected around it by the turbojet engine, from upstream (AM) to downstream (AV), the assembly being connected to a metal outlet of a turbojet engine. The aforementioned longitudinal axis X is the longitudinal axis, or axis of rotation, of the turbomachine, in particular of fan 20 and the moving blades of engine 12. The central gas ejection element may correspond to the exhaust cone, referenced 1 below, or at least to the upstream portion denoted 1a below.

Aircraft turbojet engine 10 comprises a central portion, forming gas turbine engine 12, mounted inside an engine nacelle assembly 14, as is typical of an aircraft designed for subsonic operation, such as a turboprop or a turbofan engine. Nacelle assembly 14 generally comprises an engine nacelle 16 and a fan nacelle 18 surrounding a fan 20 located axially upstream of engine 12.

Engine 12 comprises, in the axially downstream portion, at least one turbine which may be a low-pressure turbine and, again in the downstream portion, a metal exhaust casing 22 comprising an inner annular shroud 22a and an outer annular shroud 22b which between them delimit a downstream portion of the annular primary flow path 24 along which the combustion gases from the combustion chamber of engine 12 circulate.

Inner annular shroud 22a is connected, at its downstream end, to exhaust cone 1, which may comprise an upstream portion 1a of substantially cylindrical shape, and a downstream portion 1b of conical shape. Inner annular shroud 22a is aligned with the external wall of exhaust cone 1 so as to form a homogeneous flow path for the air exiting engine 12.

To reduce the noise pollution produced by the gases exiting the engine, an acoustic chamber may be arranged inside the exhaust cone, comprising acoustic partitions interposed between the external wall of exhaust cone 1 and an annular wall internal to the external wall, forming a cavity. The assembly of the acoustic partitions and the internal and external walls is not fluidtight. Indeed, a clearance exists between the partitions and the internal wall and/or the external wall. This clearance coupled with a pressure differential between the acoustic partitions creates an acceleration of the air around the acoustic partitions which generates a thermal gradient in the walls and reduces their mechanical strength. In addition, the clearance must be less than 1 mm in order to achieve the acoustic attenuation.

There is a need for improved acoustic chambers in exhaust cones.

SUMMARY

Embodiments of the present disclosure relate to an exhaust cone for an aircraft turbomachine, extending along a longitudinal axis, the cone comprising a radially internal annular wall and a radially external skin delimiting a primary flow path for hot gases and surrounding the internal annular wall, and partitions mounted radially between the external skin and the internal annular wall and intersecting them in a manner that together with the skin and wall delimits acoustic chambers, wherein the exhaust cone comprises at least one seal arranged between a radial end of one of the partitions and at least one of the portions constituting the internal annular wall or the external skin.

The seal makes it possible to limit the infiltration of air from the primary flow into the acoustic chambers. This makes it possible to improve the attenuation of the noise emitted by the turbomachine.

The seal may be interposed between a radially external end of the partition and the external annular wall.

The seal may be inserted between a radially internal end of the partition and the internal annular wall. This arrangement allows the seal to be constrained more effectively by the partition, in particular by the weight of the partition. This makes it possible to ensure a better sealing of the acoustic chamber.

The partitions may be fixed to the external skin or to the internal annular wall, for example by welding, brazing or screwing. The radially internal end may be arranged with a radial clearance relative to the internal annular wall. It is then advantageous to arrange the seal between the radially internal end and the internal annular wall.

According to one embodiment, the seal may comprise a toric portion connected to an attachment strip. The attachment strip may be fixed to a downstream face of the partition and the toric portion may be arranged at least in part against an upstream face of the partition.

The toric portion may thus be placed on the side of the maximum pressure, which makes it possible to ensure the sealing of the seal against the internal annular wall.

The attachment strip may have a thickness that is less than the radial clearance in order to allow the attachment strip to pass between the radially internal end of the partition and the internal annular wall.

In addition, the diameter of the toric portion may be greater than the radial clearance, to prevent the toric portion from passing between the partition and the internal annular wall. The seal thus obstructs the radial clearance between the partition and the internal annular wall and thus makes it possible to seal the acoustic chamber.

The attachment strip may be fixed to the partition by a locking wire passing through holes 122 provided in the partition and the attachment strip. Holes 122 of small diameter may be pierced in the partition and the locking wire can pass from one side to the other of the partition and the strap, similarly to a sewed seam. In particular, a button may be provided at the upstream face of the partition, for receiving the locking wire and holding it in the locking position. This arrangement allows limiting the air leakage in the acoustic chambers if the holes 122 are too large in diameter.

Alternatively, the attachment strip may be fixed to the partition by riveting or screwing; washers may be provided at the rivets and/or screws.

According to one embodiment, the seal may comprise an upstream toric portion and a downstream toric portion. The upstream toric portion may be arranged in contact with the upstream face of the partition and the downstream toric portion may be arranged in contact with the downstream face of the partition.

The diameter of the upstream toric portion and/or the diameter of the downstream toric portion may be less than the radial clearance.

The upstream toric portion and the downstream toric portion may be connected by a locking wire passing through holes 122 provided in the partition which holds the seal in place.

According to one embodiment, the seal may be arranged between the radially internal end of the partition and the internal wall. The upstream toric portion and the downstream toric portion of the seal may be connected by a connecting strip arranged under the radially internal end of the partition. The connecting strip may be held in place against the internal wall by the partition.

The toric portion(s) of the seal may be made by the weaving or braiding of ceramic and/or metal fibers.

In addition, the upstream and downstream toric portions of the seal may be made by the weaving or braiding of ceramic and/or metal fibers.

The seal may comprise a casing made of high-temperature material made by the weaving, braiding or winding of ceramic fibers or of high-temperature metal fibers. The seal may comprise a central body surrounded by the casing, composed of the same material as the casing or of a strand of high-temperature fibers, for example refractory or silica fibers.

The seal may comprise an attachment strip fixed to the upstream face of the partition and a curved portion comprising a convex surface bearing against the internal wall. The attachment strip may be fixed to the partition by a locking wire passing through holes 122 provided in the partition and the attachment strip. In particular, a button may be provided at the upstream face of the partition, to receive the locking wire and hold it in the locking position. Alternatively, the attachment strip may be fixed to the partition by riveting. The seal may be made of metal.

The acoustic chambers may be formed by longitudinal partitions and circumferential partitions. The longitudinal partitions and the circumferential partitions may be perpendicular to each other. The longitudinal partitions and the circumferential partitions may be perpendicular to the internal annular wall. At least one, in particular each, of the acoustic chambers may be equipped with a seal of which a portion extends along a lateral face of one of the longitudinal partitions defining the acoustic chamber and along an upstream face of the downstream circumferential partition defining the acoustic chamber.

Embodiments of the present disclosure also relate to an aircraft turbomachine comprising an exhaust cone as mentioned above.

DETAILED DESCRIPTION

Figure 1:
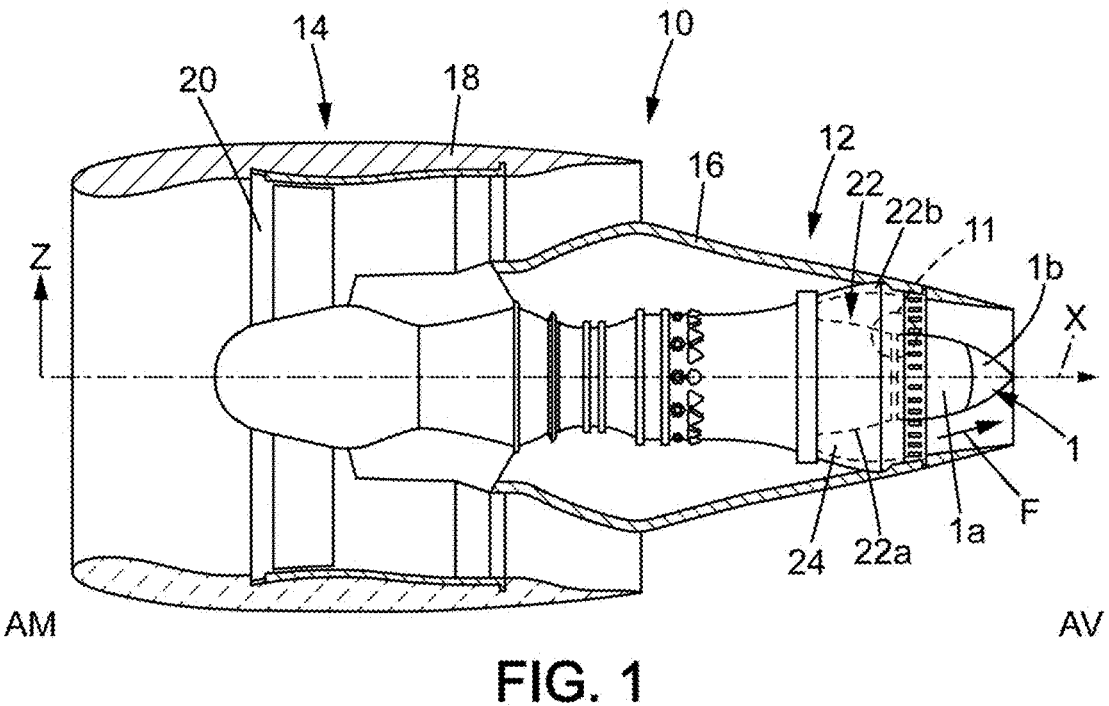
FIG. 1 represents a section view of a turbomachine according to the prior art.
Figure 2:
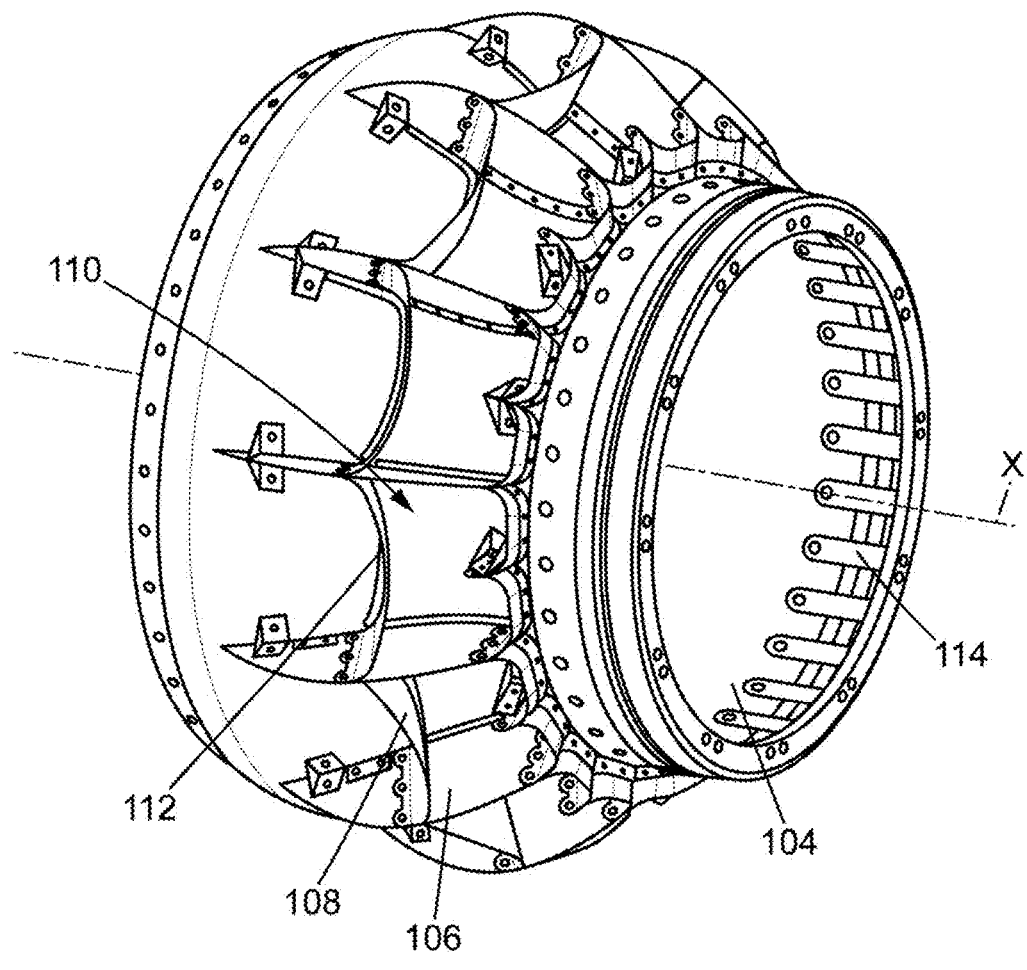
FIG. 2 represents a perspective view of an upstream portion of an exhaust cone comprising an acoustic structure equipped with a first embodiment of the seal.
Figure 3:
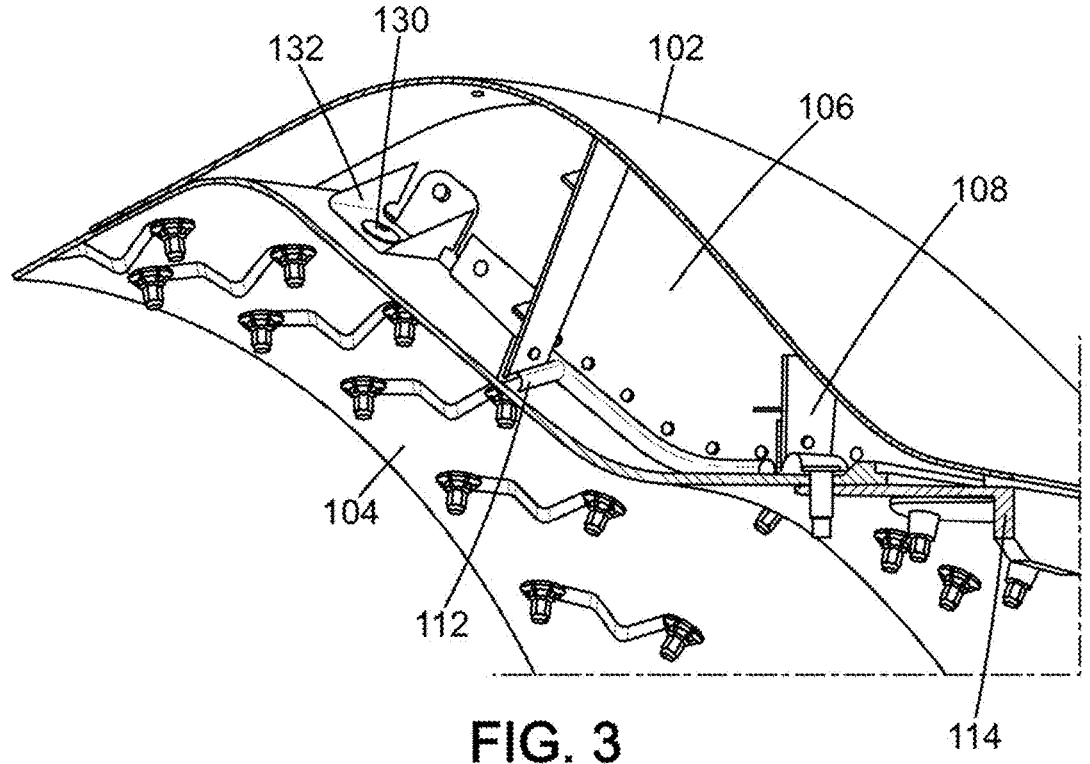
FIG. 3 represents a section view of the upstream portion of the exhaust cone of FIG. 2.

FIG. 2 shows an upstream portion of an exhaust cone which may be exhaust cone 1 of FIG. 1. FIG. 3 shows a section view of the upstream portion of FIG. 2. This upstream portion comprises an external skin 102 which is annular around longitudinal axis X. External skin 102 is made of a ceramic matrix composite and surrounds an internal annular wall 104 which is also made of a ceramic matrix composite. External skin 102 and/or internal wall 104 are connected upstream to an exhaust casing, for example exhaust casing 22, and downstream to a conical wall of the exhaust cone by a connecting flange 114. In particular, external skin 102 is fixed at its downstream portion to the exhaust cone and is unattached at its upstream portion and only internal wall 104 is fixed upstream, to the exhaust casing.

Longitudinal partitions 106 and circumferential partitions 108 are arranged between external skin 102 and internal wall 104. Partitions 106 and 108 extend substantially perpendicularly to internal wall 104. Longitudinal partitions 106 are also substantially perpendicular to circumferential partitions 108 and form a honeycomb structure, comprising acoustic chambers 110 provided for the attenuation of noise in the turbomachine.

Longitudinal partitions 106 are fixed to internal wall 104 by screws 130 through retaining brackets 132 which are also fixed to the longitudinal partitions. Each circumferential partition 108 is interposed circumferentially between two consecutive longitudinal partitions and the circumferential partition 108 is fixed on each side to the two consecutive longitudinal partitions. The assembly of the partitions to internal wall 104 does not ensure fluidtightness of the acoustic chambers because a radial clearance remains between a radially internal end 107 of partitions 108, 106 and the internal wall 104. A portion of the air flow F through the turbomachine may infiltrate into acoustic chambers 110 through this radial clearance. In addition, this clearance impacts the attenuation of noise because the acoustic waves are no longer correctly channeled into the chamber.

Figure 4:
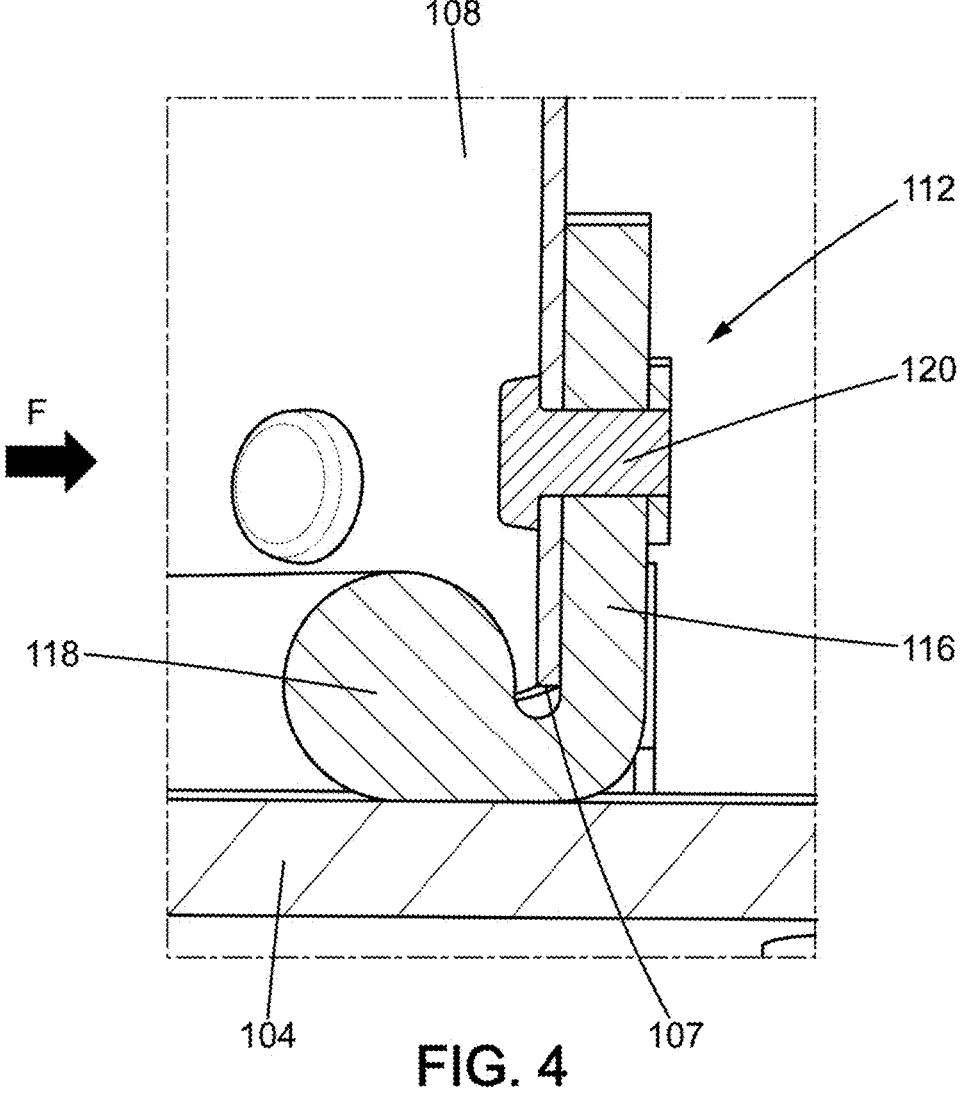
FIG. 4 represents an enlarged view of one end of one of the partitions of the acoustic structure of FIGS. 2 and 3.

To limit such infiltration, a seal 112 is mounted so that it fills in the radial clearance. FIG. 4 shows the arrangement of seal 112 relative to circumferential partition 108 but this arrangement can be applicable to longitudinal partition 106. Seal 112 comprises a toric portion 118 connected to an attachment strip 116. Attachment strip 116 may have a rectangular cross-section and is fixed to the downstream face of circumferential partition 108 by rivets 120 for example. The thickness of attachment strip 116 is less than the radial clearance between end 107 and internal wall 104.

End 107 of circumferential partition 108 abuts against toric portion 118, in particular where toric portion 118 and attachment strip 116 join.

Toric portion 118 is arranged against the upstream face of circumferential partition 108.

Toric portion 118 has a diameter greater than the radial clearance, and is thus held in place.

Figure 5:
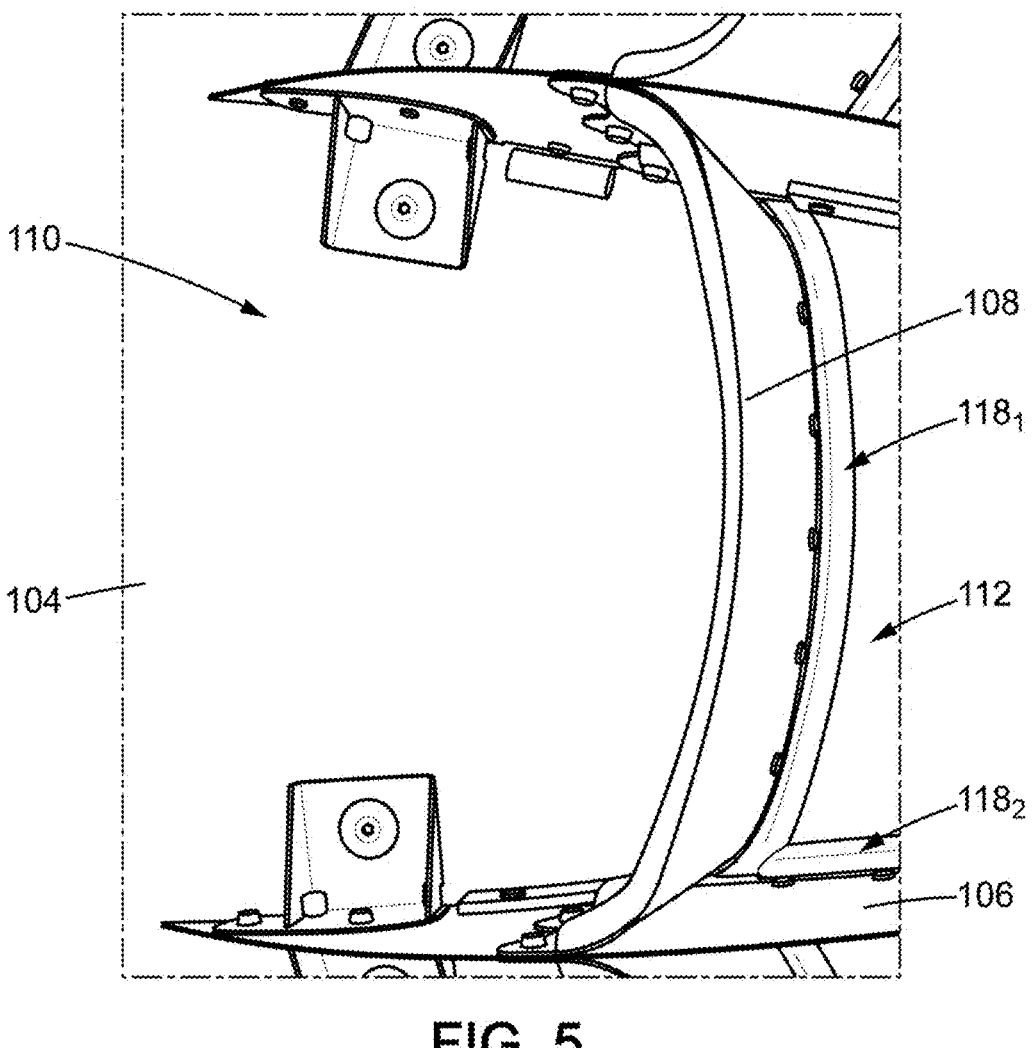
FIG. 5 represents a front view of a first acoustic chamber of the acoustic structure of FIGS. 2 to 4.
Figure 6:
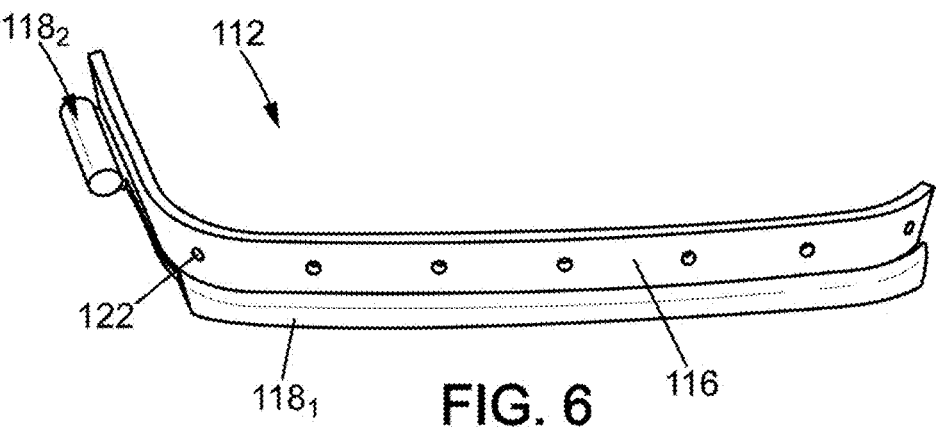
FIG. 6 represents a perspective view of the seal equipping the first acoustic chamber of FIG. 5.

A first acoustic chamber 110 is represented in FIG. 5 and comprises a seal 112A, similar to seal 112 of FIG. 6. First acoustic chamber 110 is formed by two longitudinal partitions 106 and a downstream circumferential partition 108 which is fixed to each of longitudinal partitions 106 at its circumferential ends. Seal 112A is made as a single part. Attachment strip 116 of seal 112A has a shape complementary to the downstream surface of circumferential partition 108 and a portion of longitudinal partition 106. A first toric portion 1181 of seal 112 has a shape complementary to the upstream surface of circumferential partition 108. A second toric portion 1182 of seal 112 is arranged at longitudinal partition 106.

Figure 7:
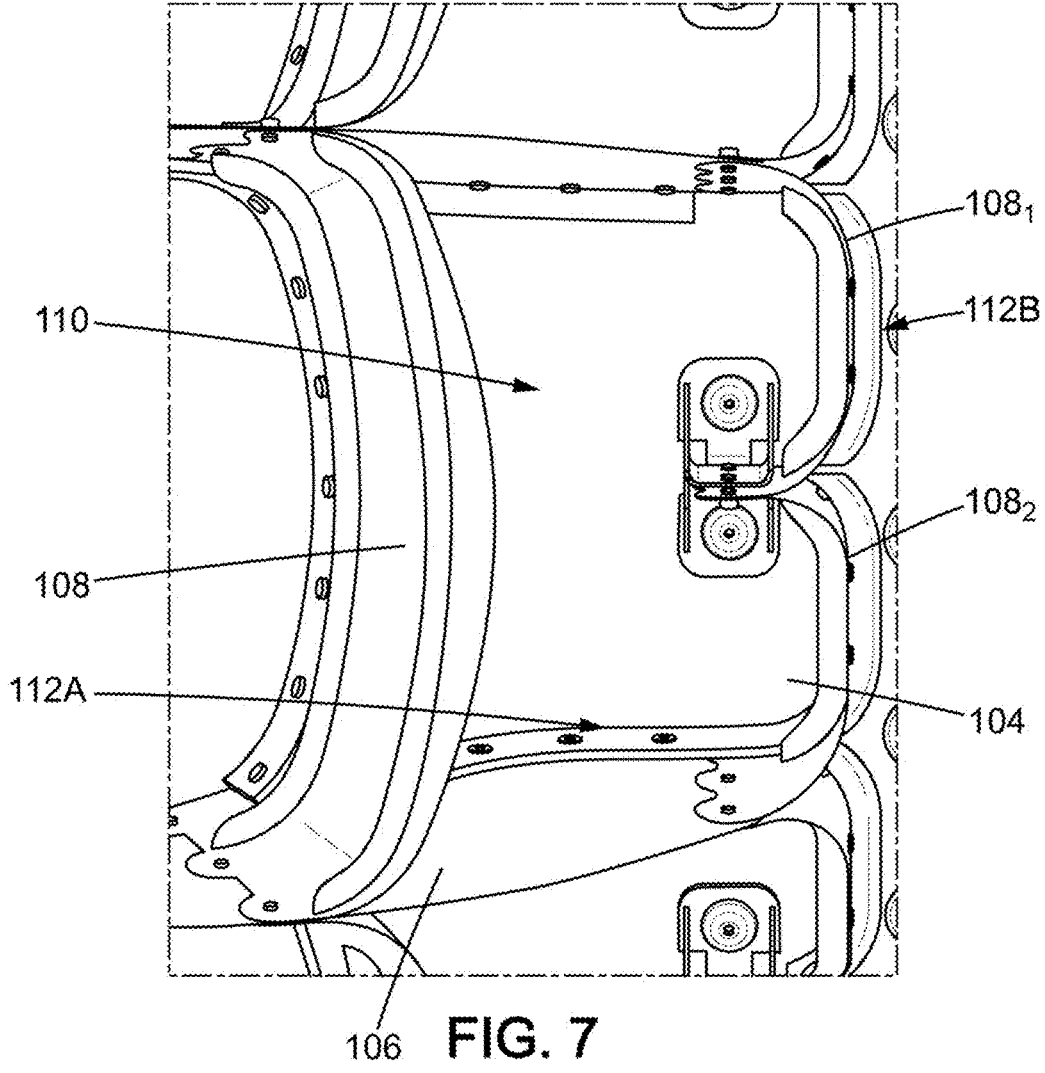
FIG. 7 represents a front view of a second acoustic chamber of the acoustic structure of FIGS. 2 to 4.
Figures 8, 9:
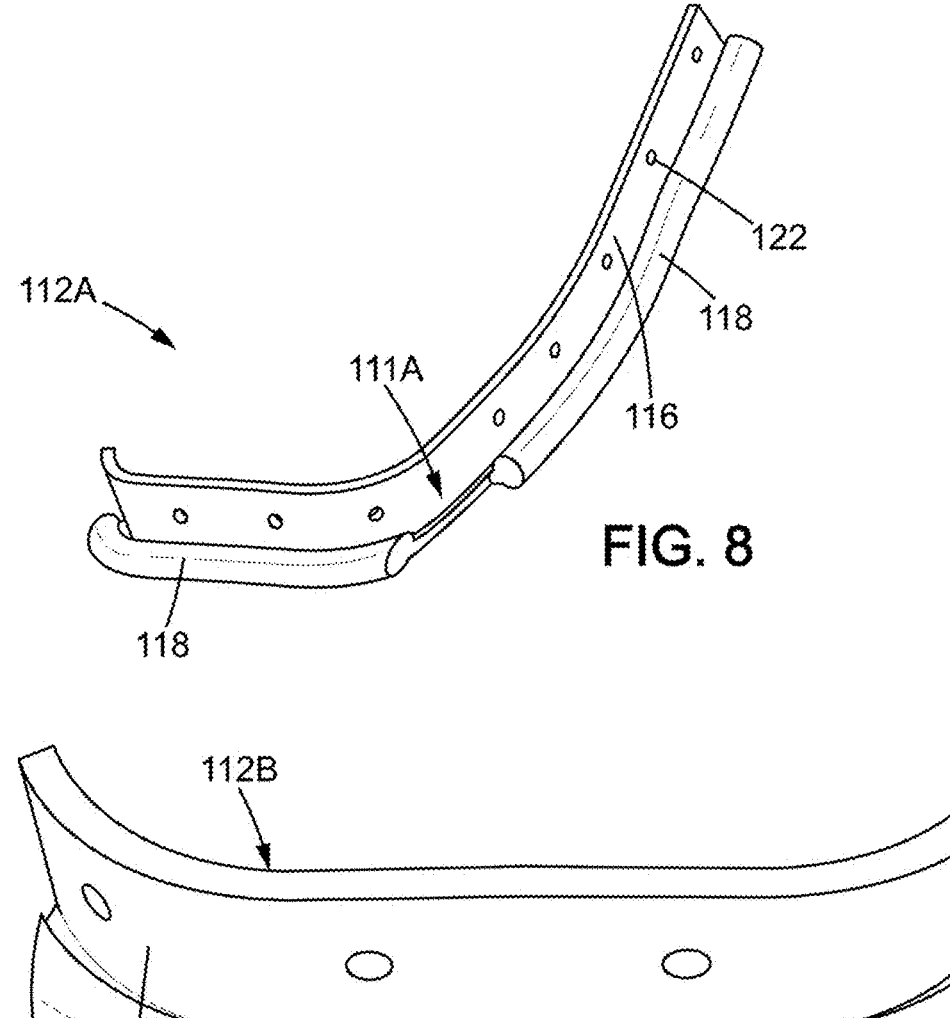
FIG. 8 represents a perspective view of a first seal equipping the second acoustic chamber of FIG. 7.
FIG. 9 represents a perspective view of a second seal equipping the second acoustic chamber of FIG. 7.

A second acoustic chamber 110 is represented in FIG. 7 and comprises seal 112A of FIG. 8. Second acoustic chamber 110 is formed laterally by two longitudinal partitions 106. Second acoustic chamber 110 is formed upstream by a downstream circumferential partition 108 fixed to each of longitudinal partitions 106 at its circumferential ends. Second acoustic chamber 110 is also formed upstream by a first circumferential partition 1081 and a second circumferential partition 1082 which are fixed together by an attachment to internal wall 104 and to the longitudinal partitions. First circumferential partition 1081 is equipped with seal 112B and second circumferential partition 1082 is equipped with seal 112A. Seal 112A is formed by a seal portion in which a specific cut has been made to accommodate the geometry of walls 1082 and 106. Seal 112A, when mounted in acoustic chamber 110, has a shape that is complementary to second circumferential partition 1082 and to longitudinal partition 106 adjacent to second circumferential partition 10812. Seal 112A comprises a cutout 111A in toric portion 118 and thus allows insertion of seal 112A into second acoustic chamber 110.

Seal 112B is shown in FIG. 9. Seal 112B comprises a seal portion with no cutout and which has a shape complementary to the downstream surface of first circumferential partition 1081, when seal 112B is mounted in acoustic chamber 110.

Seal 112, 112A or 112B comprises an outer shell made of high-temperature material produced by the weaving, braiding or winding of ceramic fibers and/or of high-temperature metal fibers. This outer shell surrounds a central body of seal 112 which is made of the same material as the outer shell or of a strand of high-temperature fibers, for example refractory or silica fibers.

Figure 10:
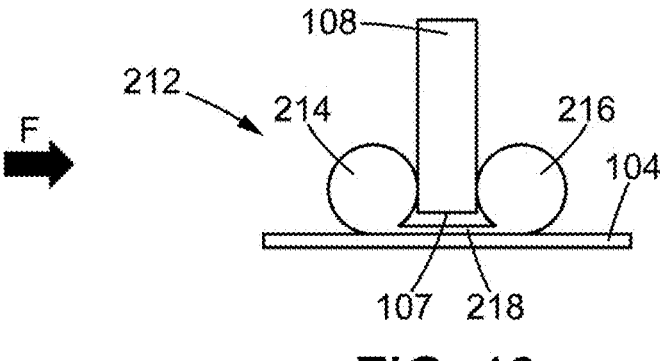
FIG. 10 represents an enlarged view of one end of one of the partitions of the acoustic structure equipped with a second exemplary embodiment of the seal.

A second example of seal 212 is represented in FIG. 10. Seal 212 comprises a first toric portion 214 arranged against an upstream face of circumferential partition 108 and a second toric portion 216 arranged against a downstream face of circumferential partition 108. First and second toric portions 214 and 216 each have a diameter greater than the radial clearance between end 107 and internal wall 104. Seal 212 comprises an outer shell made of high-temperature material produced by the weaving, braiding or winding of ceramic fibers and/or of high-temperature metal fibers. This outer shell surrounds a central body of seal 212 made of the same material as the outer shell or of a strand of high-temperature fibers, for example refractory or silica fibers.

First toric portion 214 is connected to second toric portion 216 by a connecting strip 218 which has a rectangular cross-section. Connecting strip 218 is arranged between end 107 and internal wall 104. Connecting strip 218 has a thickness that is less than the radial clearance.

Figure 11:
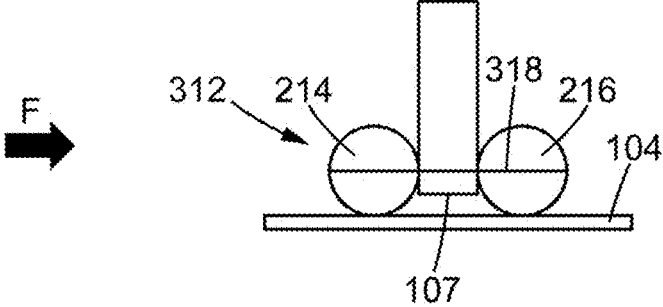
FIG. 11 represents an enlarged view of one end of one of the partitions of the acoustic structure equipped with a third exemplary embodiment of the seal.

Alternatively, in third seal 312 of FIG. 11, first toric portion 214 is connected to second toric portion 216 by a locking wire 318 passing through holes 122 provided in circumferential partition 108 and toric portions 214 and 216. Locking wire 318 may be made of metal.

Figure 12:
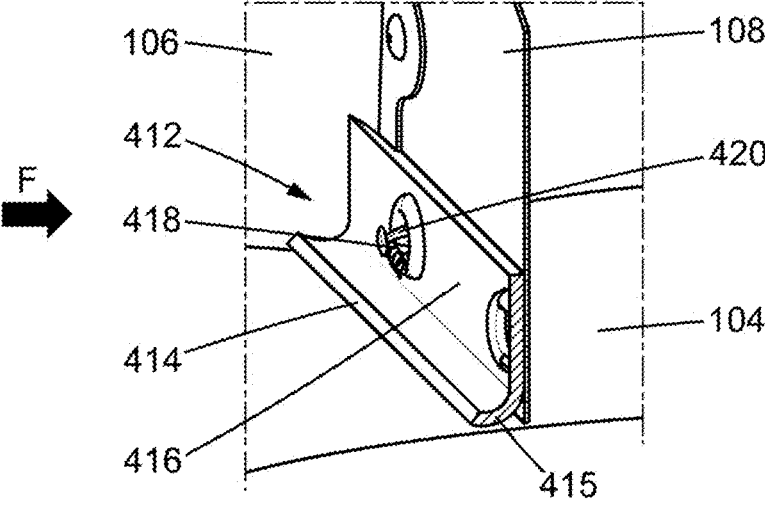
FIG. 12 represents an enlarged view of one end of one of the partitions of the acoustic structure equipped with a fourth exemplary embodiment of the seal.

A fourth seal 412 is represented in FIG. 12 and comprises an attachment strip 416 fixed to the upstream face of circumferential partition 108. Seal 412 comprises a curved portion 414 comprising a convex surface 415 arranged in contact with internal wall 104. Curved portion 414 has a "U" shape and has a concave surface opposite to convex surface 415 and facing towards external skin 102.

Attachment strip 416 is connected to the upstream face of the circumferential partition by a locking wire passing through attachment strip 416 and circumferential partition 108 and held tight by a button 420.

Each among seal 212, seal 312, and seal 412 are described in relation to circumferential partition 108 but may be arranged at a longitudinal partition.

The invention claimed is:

1. An exhaust cone for an aircraft turbomachine, extending along a longitudinal axis, the exhaust cone comprising:
   a radially internal annular wall;
   a radially external skin delimiting a primary flow path for hot gases and surrounding the internal annular wall;
   partitions mounted radially between the external skin and the internal annular wall and intersecting the external skin and the internal annular wall in a manner that together with the external skin and internal annular wall delimits acoustic chambers; and
   at least one seal arranged between a radial end of one of the partitions and at least one of the partitions constituting the internal annular wall or the external skin, wherein the at least one seal comprises at least one toric portion arranged at least in part against an upstream face of at least one of the partitions.

2. The exhaust cone according to claim 1, wherein the at least one seal comprises the at least one toric portion connected to an attachment strip, wherein the attachment strip is fixed to a downstream face of the partition and the at least one toric portion is arranged at least in part against an upstream face of the at least one of the partitions.

3. The exhaust cone according to claim 1, wherein the at least one seal comprises an upstream toric portion and a downstream toric portion, wherein the upstream toric portion is arranged in contact with the upstream face of the partition and the downstream toric portion is arranged in contact with the downstream face of the partition.

4. The exhaust cone according to claim 3, wherein the upstream toric portion and the downstream toric portion are connected by a locking wire passing through holes provided in the partition.

5. The exhaust cone according to claim 3, wherein the at least one seal is arranged between the radially internal end of the partition and the internal wall, and wherein the upstream toric portion and the downstream toric portion of the at least one seal are connected by a connecting strip arranged under the radially internal end of the partition.

6. The exhaust cone according to claim 1, wherein the at least one seal comprises an upstream toric portion and a downstream toric portion, and wherein the at least one toric portion of the at least one seal is made by the weaving or braiding of ceramic or metal fibers or wherein the upstream and downstream toric portions of the at least one seal are made by the weaving or braiding of ceramic or metal fibers.

7. The exhaust cone according to claim 1, wherein the at least one seal comprises an attachment strip fixed to the upstream face of the partition and a curved portion comprising a convex surface bearing against the internal wall.

8. The exhaust cone according to claim 2, wherein the attachment strip is fixed to the partition by a locking wire passing through holes provided in the partition and the attachment strip.

9. The exhaust cone according to claim 1, wherein the acoustic chambers are formed by longitudinal partitions and circumferential partitions, wherein at least one of the acoustic chambers is equipped with a seal of which a portion extends along a lateral face of one of the longitudinal partitions defining the acoustic chamber and along an upstream face of the downstream circumferential partition defining the acoustic chamber.

10. A turbomachine for an aircraft comprising an exhaust cone according to claim 1.

11. An exhaust cone for an aircraft turbomachine, extending along a longitudinal axis, the exhaust cone comprising:
a radially internal annular wall;
a radially external skin delimiting a primary flow path for hot gases and surrounding the internal annular wall;
partitions mounted radially between the external skin and the internal annular wall and intersecting the external skin and the internal annular wall in a manner that together with the external skin and internal annular wall delimits acoustic chambers; and at least one seal arranged between a radial end of one of the partitions and at least one of the partitions constituting the internal annular wall or the external skin, wherein the at least one seal comprises at least one toric portion arranged at least in part against an upstream face of at least one of the partitions,
wherein the at least one seal comprises an upstream toric portion and a downstream toric portion, wherein the upstream toric portion is arranged in contact with the upstream face of the partition and the downstream toric portion is arranged in contact with the downstream face of the partition, and
wherein the upstream toric portion and the downstream toric portion are connected by a locking wire passing through holes provided in the partition.

12. An exhaust cone for an aircraft turbomachine, extending along a longitudinal axis, the exhaust cone comprising:
a radially internal annular wall;
a radially external skin delimiting a primary flow path for hot gases and surrounding the internal annular wall;
partitions mounted radially between the external skin and the internal annular wall and intersecting the external skin and the internal annular wall in a manner that together with the external skin and internal annular wall delimits acoustic chambers; and
at least one seal arranged between a radial end of one of the partitions and at least one of the partitions constituting the internal annular wall or the external skin, wherein the at least one seal comprises at least one toric portion arranged at least in part against an upstream face of at least one of the partitions,
wherein the at least one seal comprises an upstream toric portion and a downstream toric portion, wherein the upstream toric portion is arranged in contact with the upstream face of the partition and the downstream toric portion is arranged in contact with the downstream face of the partition, and
wherein the at least one seal is arranged between the radially internal end of the partition and the internal wall, and wherein the upstream toric portion and the downstream toric portion of the at least one seal are connected by a connecting strip arranged under the radially internal end of the partition.

\* \* \* \* \*